United States Patent
McDonald et al.

(10) Patent No.: US 6,239,736 B1
(45) Date of Patent: May 29, 2001

(54) RANGE-GATED RADAR MOTION DETECTOR

(75) Inventors: Kevin B. McDonald; Charles R. Barrows, both of Portland; Stephen K. Bigelow, Aloha; Steven J. McCoy, Clackamas, all of OR (US)

(73) Assignee: Interlogix, Inc., Tualatin, OR (US)

( * ) Notice: Subject to any disclaimer, the term of this patent is extended or adjusted under 35 U.S.C. 154(b) by 0 days.

(21) Appl. No.: 09/430,254

(22) Filed: Oct. 29, 1999

Related U.S. Application Data
(60) Provisional application No. 60/130,580, filed on Apr. 21, 1999.

(51) Int. Cl.$^7$ ............................................. G01S 13/56
(52) U.S. Cl. ........................ 342/28; 342/110; 342/115; 342/114; 340/554
(58) Field of Search ........................... 342/21, 27, 28, 342/104, 105, 109, 110, 111, 112, 114, 115, 129; 340/541, 552, 554, 565, 567

(56) References Cited

U.S. PATENT DOCUMENTS

| | | | |
|---|---|---|---|
| 3,662,316 | 5/1972 | Robbins | 375/256 |
| 3,750,025 | 7/1973 | Ross | 375/256 |
| 3,772,697 | 11/1973 | Ross | 342/21 |
| 4,743,906 | 5/1988 | Fullerton | 342/27 |
| 4,979,186 | 12/1990 | Fullerton | 375/23 |
| 5,142,284 | 8/1992 | Trent et al. | 341/122 |
| 5,345,471 | 9/1994 | McEwan | 375/1 |
| 5,361,070 | 11/1994 | McEwan | 342/21 |
| 5,363,108 | 11/1994 | Fullerton | 342/27 |
| 5,457,394 | 10/1995 | McEwan | 324/642 |
| 5,465,094 | 11/1995 | McEwan | 342/28 |
| 5,510,800 | 4/1996 | McEwan | 342/387 |
| 5,512,834 | 4/1996 | McEwan | 324/642 |
| 5,519,400 | 5/1996 | McEwan | 342/28 |
| 5,521,600 | 5/1996 | McEwan | 342/27 |
| 5,523,760 | 6/1996 | McEwan | 342/89 |
| 5,563,605 | 10/1996 | McEwan | 342/202 |
| 5,573,012 | 11/1996 | McEwan | 128/782 |
| 5,576,627 | 11/1996 | McEwan | 324/639 |
| 5,581,256 | 12/1996 | McEwan | 342/27 |
| 5,589,838 | 12/1996 | McEwan | 342/387 |

(List continued on next page.)

OTHER PUBLICATIONS

"SafeGate™ Series RGR Detector Installation Instructions," Copyright 1998 (Nov. 1998), Sentrol, Tualatin, OR.

*Primary Examiner*—John B. Sotomayor
(74) *Attorney, Agent, or Firm*—Stoel Rives LLP

(57) ABSTRACT

A motion detector combines an FCC approved homodyne pulsed range-gated radar ("RGR") detector (10) and a PIR detector (158). Narrow microwave pulses are transmitted at a predetermined pulse repetition frequency ("PRF") and the pulses are reflected by a target. The RGR detector senses the presence of moving human sized objects within predetermined ranges. Moving objects beyond the ranges are not sensed. The RGR detector employs a pulsed microwave oscillator (12) that is triggered by a system clock (14) and immediately retriggered after a 3 to 100 nanosecond delay (20). The duration of each pulse is 3 to 20 nanoseconds with a half-sine envelope shape. The RGR employs a homodyne detector (36) and shares an antenna (38) with the transmitter. The receiver range is determined by the delay imposed between the transmitted pulses, the first being a transmitted pulse and the second being a local oscillator pulse. Each received 5.8 GHz pulse is mixed down to a baseband by the homodyne detector. The detected baseband signal is amplified, processed, and filted to frequencies below 100 Hz. If the output exceeds a predetermined threshold, an alarm condition is indicated. The threshold is adjustable as a function of range and may be set to discriminate object sizes. The PIR detector operates conventionally, but its output is logically combined with the RGR detector output to reduce false-alarm indications.

20 Claims, 8 Drawing Sheets

U.S. PATENT DOCUMENTS

| | | | |
|---|---|---|---|
| 5,609,059 | 3/1997 | McEwan | 73/290 R |
| 5,610,611 | 3/1997 | McEwan | 342/89 |
| 5,630,216 | 5/1997 | McEwan | 455/215 |
| 5,661,490 | 8/1997 | McEwan | 342/387 |
| 5,682,164 | 10/1997 | McEwan | 342/27 |
| 5,754,144 | 5/1998 | McEwan | 343/786 |
| 5,757,320 | 5/1998 | McEwan | 342/387 |
| 5,766,208 | 6/1998 | McEwan | 600/595 |
| 5,767,953 | 6/1998 | McEwan | 356/5.01 |
| 5,774,091 | 6/1998 | McEwan | 342/387 |
| 5,986,600 | 11/1999 | McEwan | 342/27 |
| 6,121,919 | 11/1999 | Ameen et al. | 342/174 |

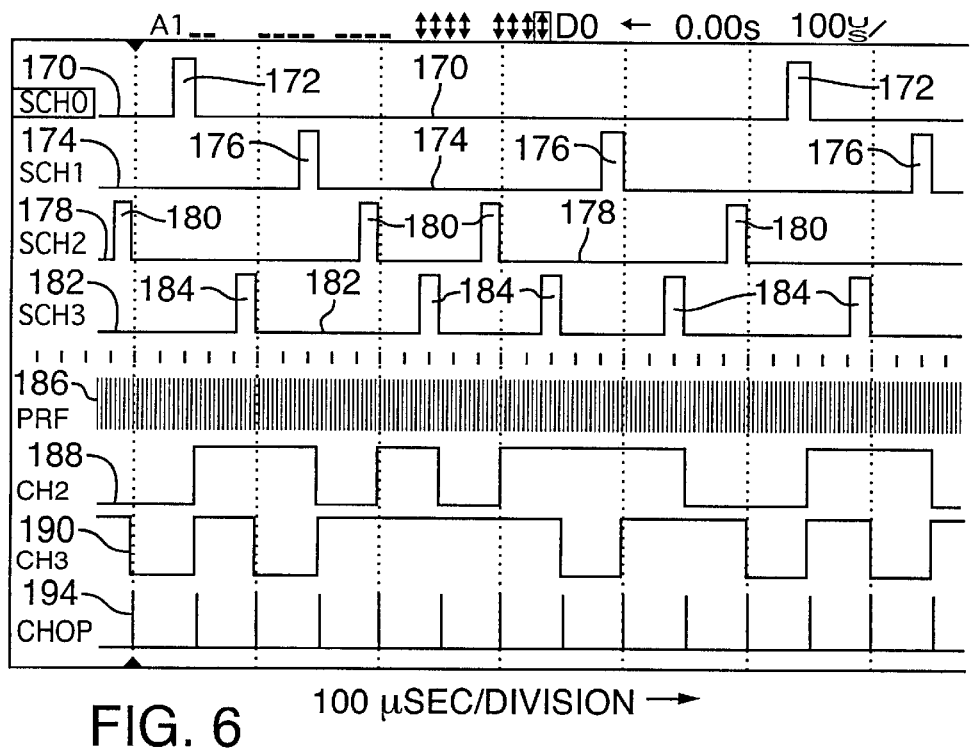
FIG. 6  100 μSEC/DIVISION →
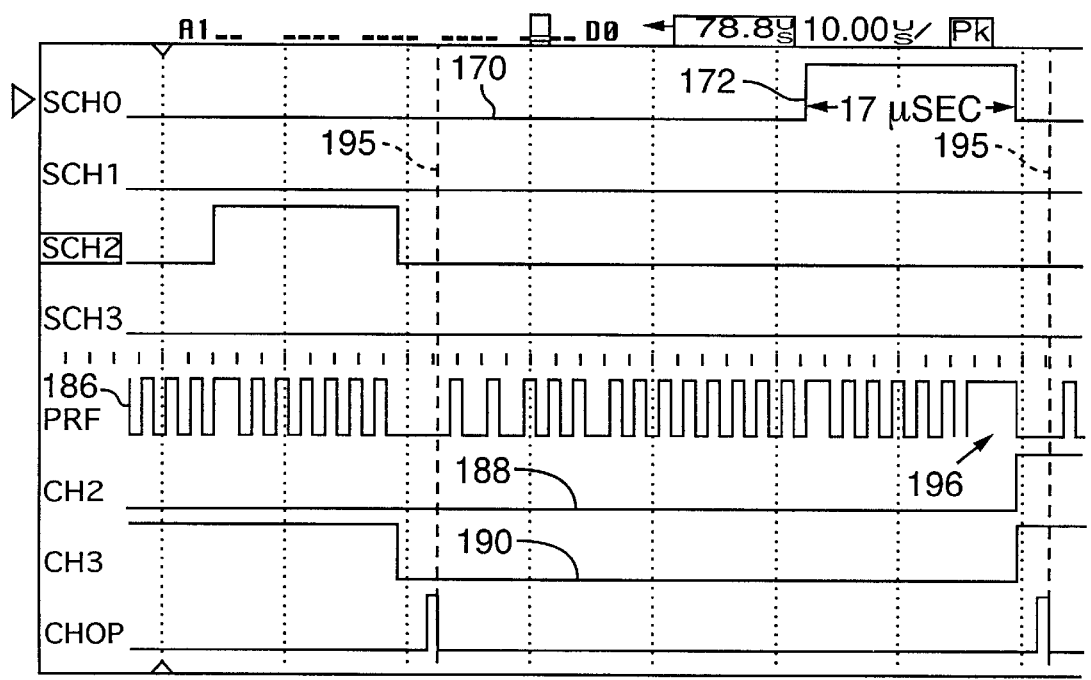
FIG. 7  10 μSEC/DIVISION →

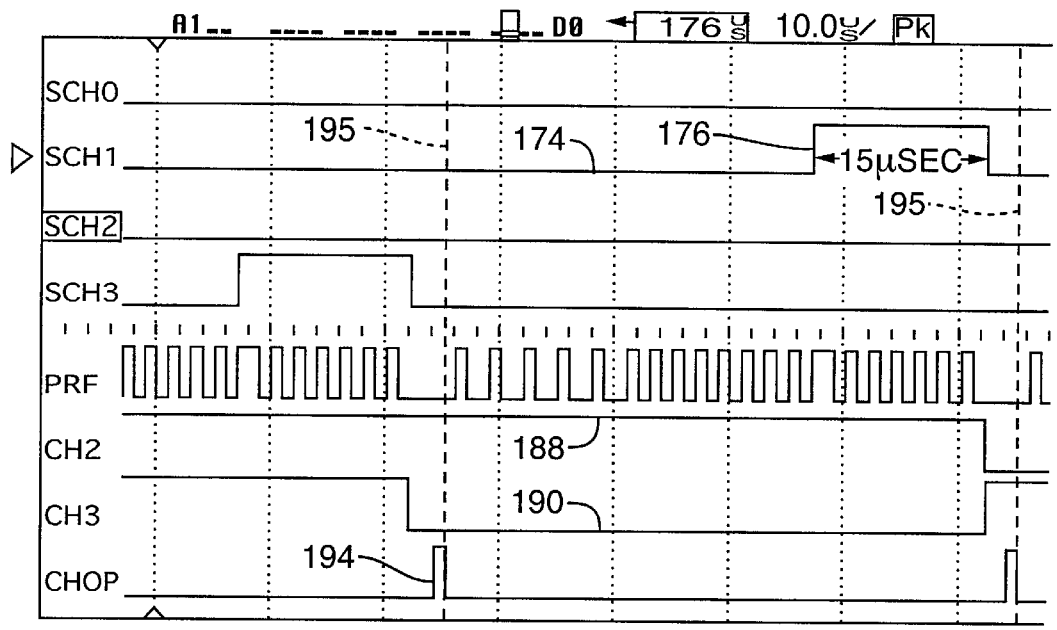
FIG. 8    10 μSEC/DIVISION →
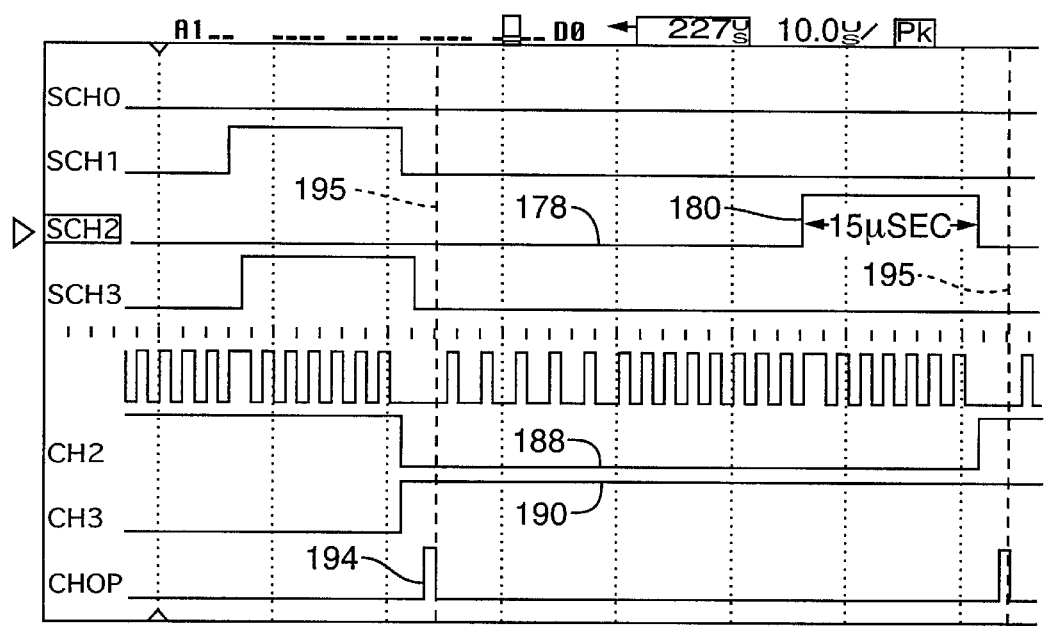
FIG. 9    10 μSEC/DIVISION →

RANGE-GATED RADAR MOTION DETECTOR

RELATED APPLICATIONS

This application claims priority from U.S. Provisional Application No. 60/130,580, filed Apr. 21, 1999, for MICRO-IMPULSE RADAR MOTION DETECTOR now expired.

TECHNICAL FIELD

This invention relates to intrusion monitoring security systems and more particularly to a range-gated radar motion detector.

BACKGROUND OF THE INVENTION

There are previously known apparatus and methods for detecting intrusion into a space. Common detectors include door and window contacts, glass break detectors, and motion sensors. Motion detectors typically employ ultrasound, passive infrared ("PIR"), or radar detection techniques. Ultrasonic motion detectors are commonly used for automatic door openers and security alarms. They are inexpensive and can operate with narrow beamwidths. However, installation options are limited because ultrasonic beams are easily blocked by thin materials, including paper. Another disadvantage is false triggering caused by reflections from blowing curtains, pets, and flying insects.

PIR motion detectors are perhaps the most frequently used home security device. They employ a special Fresnel lens to generate multiple thermal images of a warm object, such as a person. As the person traverses the PIR field of view, the thermal images produce periodic fluctuations that are detectable by inexpensive electronics. As with ultrasound detectors, PIR detectors are disadvantageous because they can be blocked by a sheet of paper. Moreover, PIR detectors have no range adjustment and may be false-triggered by pets or rodents.

Radar-based motion detectors may emit a continuous-wave ("CW") microwave signal and compare the emitted and echo frequencies to produce a beat frequency that is proportional to range. Such detectors employ microwave oscillators, detector diodes, and audio frequency processing electronics to detect objects. Nonranging radar detectors emit a CW microwave carrier and detect a Doppler shifted echo from a sensed moving object. Such swept and Doppler radar-based motion detectors are disadvantageous because of limited materials penetration, microphonics, frequency crowding, poor short-range operation, and difficulty meeting Federal Communications Commission ("FCC") testing and certification requirements.

Some of the disadvantages of swept and Doppler radar-based motion detectors have been circumvented by another radar-based motion sensing technique. U.S. Pat. No. 5,361,070 for ULTRA-WIDEBAND RADAR MOTION SENSOR describes ultra-wideband ("UWB") radar motion sensing in which a UWB radar operates as a pulse-echo system that clocks the two-way time of flight of a very short electrical pulse. Rather than employing a carrier frequency, a fast electrical voltage impulse is applied directly to an antenna. The resulting spread spectrum emissions resemble the Fourier transform of the emitted pulse and generally span hundreds of megaHertz to several gigaHertz. Because most materials exhibit rapidly increasing attenuation with frequency, UWB radar is advantageous for materials penetration, allowing installation of UWB radar detectors behind walls and appliance panels, above ceilings, and below floors. UWB radar motion detectors are also advantageous for detecting close objects and may have an adjustable sensing range. The patent asserts that "a frequency allocation by the FCC is not relevant" because of the UWB emissions. However, UWB radar-based motion detectors have not attained market acceptance because they have not readily met FCC regulatory limits as an intentional radiator, a fact that is well documented in "The Development and Commercialization of Micropower Impulse Radar at Lawrence Livermore National Laboratory", a report by the Democratic Staff Committee on Science, U.S. House of Representatives, Apr. 12, 1999.

SUMMARY OF THE INVENTION

An object of this invention is, therefore, to provide an apparatus and a method for sensing moving objects that overcomes the disadvantages of prior motion detectors.

Another object of this invention is to provide a radar-based motion detector that is FCC approved as an intentional radiator.

A further object of this invention is to provide a combined PIR and radar-based motion detector.

Still another object of this invention is to provide a motion detector having predetermined ranges and object size discrimination.

A motion detector of this invention employs an FCC approved homodyne pulsed range-gated radar ("RGR") detector that may also be combined with a PIR detector to improve detection flexibility and reduce false-alarm conditions. Narrow microwave pulses are transmitted at a predetermined pulse repetition frequency ("PRF"), and the pulses are reflected by a moving target. The RGR detector senses the presence of moving human sized objects within predetermined ranges. Moving objects beyond the ranges are not sensed. Stationary objects are not sensed because the RGR detector is AC coupled, although DC-coupled applications are possible and exist.

The RGR detector employs a pulsed 5.8 GHz microwave oscillator that is triggered by a system clock and immediately retriggered after a 10 to 70 nanosecond delay. The duration of each triggered pulse is 3 to 20 nanoseconds of carrier having a half-sine envelope shape. The PRF of the transmitted pulses is about 312.5 to 400 kHz. The average power of the transmitted pulses is designed to stay within FCC regulatory limits set forth in 47 CFR Parts 15.209 and 249 (1999).

The RGR employs homodyne detection and shares the same antenna as the transmitter. The receiver range is determined by imposing a predetermined delay between transmitting a pulse and enabling the receiver. Each received 5.8 GHz pulse is mixed down to a baseband by a homodyne peak detector. The detected baseband signal is amplified, processed, and filtered to frequencies below 500 Hz. If the output exceeds a predetermined threshold, an alarm condition is indicated. The threshold is adjustable as a function of range and may be set to discriminate object sizes.

The PIR detector operates conventionally, but its output may be logically combined with the RGR detector output to further reduce false-alarm indications, or it may be disabled to operate in microwave mode only.

Additional objects and advantages of this invention will be apparent from the following detailed description of a preferred embodiment thereof that proceeds with reference to the accompanying drawings.

BRIEF DESCRIPTION OF THE DRAWINGS

FIG. 6 is an oscillographic representation showing control signal transitions occurring during a 500 microsecond (usec.) period starting during a detection cycle.

FIG. 7 is an oscillographic representation showing control signal transitions occurring during a 50 usec period including a range 0 (9 foot) detection cycle.

FIG. 8 is an oscillographic representation showing control signal transitions occurring during a period 50 usec period including the range 1 (18 foot) detection cycle.

FIG. 9 is an oscillographic representation showing control signal transitions occurring during a period 50 usec period including the range 2 (27 foot) detection cycle.

DETAILED DESCRIPTION OF A PREFERRED EMBODIMENT

Figures 1, 2:
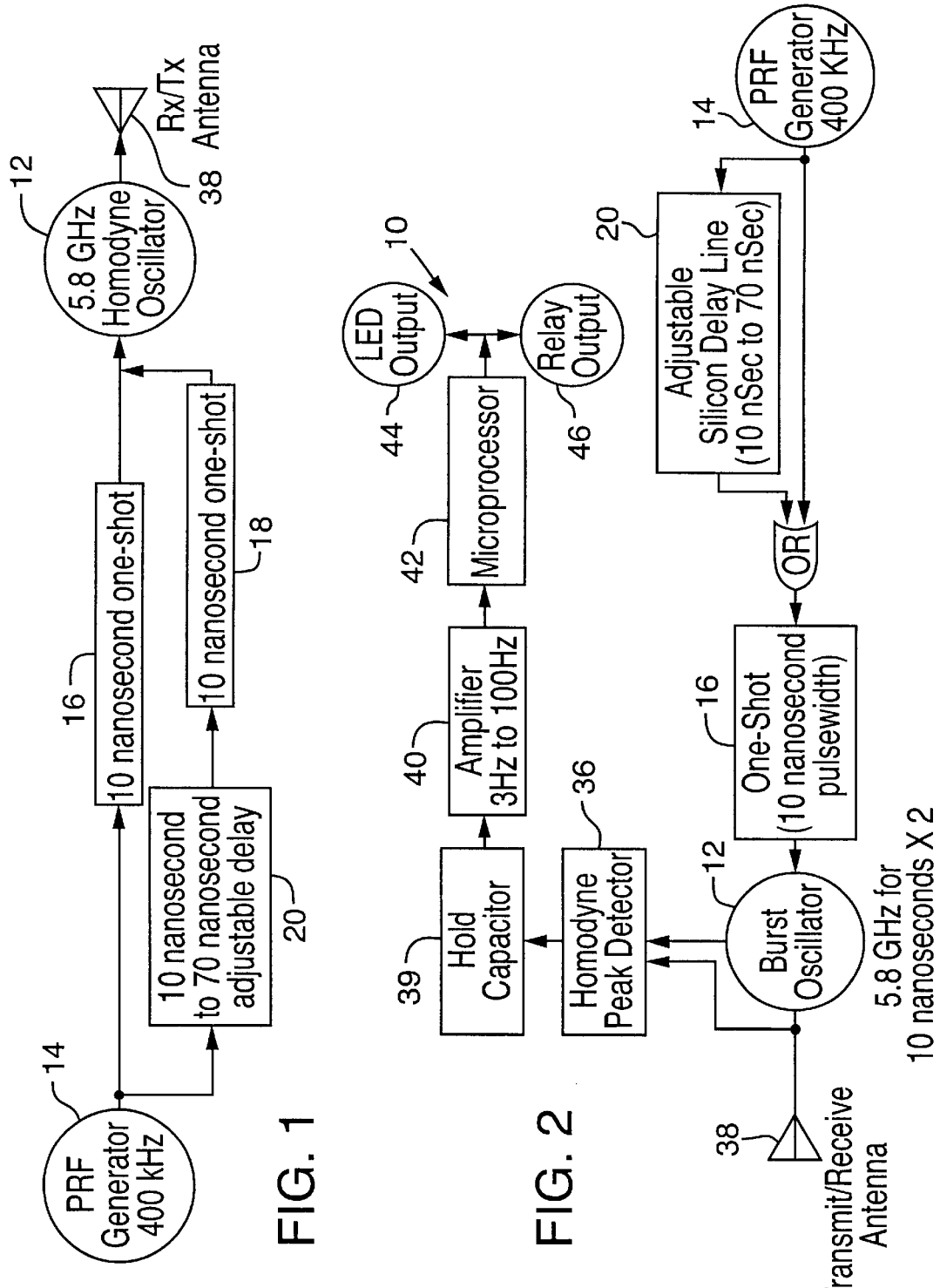
FIG. 1 is a functional block diagram of a range-gated radar transmitter employed in a motion detector of this invention.
FIG. 2 is a functional block diagram of a range-gated radar transceiver and signal processor employed in the motion detector of this invention.

Referring to FIGS. 1 and 2, a motion detector 10 of this invention employs an FCC approved homodyne pulsed range-gated radar ("RGR") detector that may also be combined with a PIR detector to improve detection flexibility and reduce false-alarm conditions. An RGR transmitter 12 emits 10 nsec, 5.8 GHz microwave transmit pulses at a PRF in a range from 50 to 500 kHz (preferably 400 KHz) PRF in response to a PRF generator 14 and a 10-nsec one-shot 16. The pulses are immediately retriggered by another 10-nsec one-shot 18 in response to an adjustable 3 to 100 nanosecond (preferably 10 to 70 nanosecond) delay circuit 20 to generate 10-nsec local-oscillator pulses. The duration of each triggered pulse is 3 to 20 nanoseconds (preferably 10 nanoseconds) with a half-sine envelope shape. The PRF generator is derived from a 10 MHZ microprocessor system clock (FIG. 5B).

Figure 3:
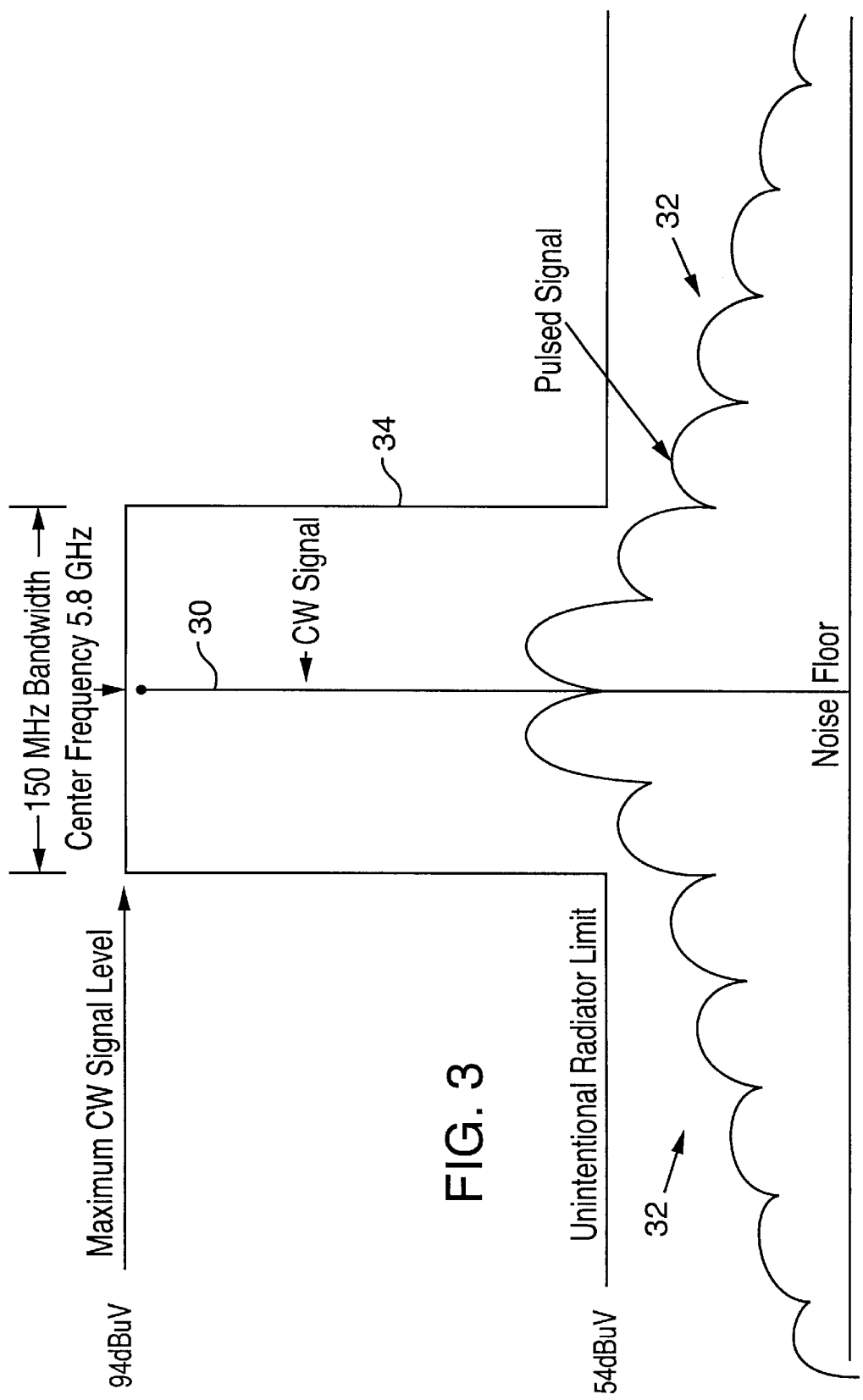
FIG. 3 graphically represents a measured radio-frequency spectrum of the transmitter of FIG. 1 overlayed on the FCC regulatory limits for intentional radiators set forth in 27 CFR §§15.209 and 249.

The RGR of this invention generates radio-frequency pulses including bursts of less than about 50 cycles of microwave energy. FIG. 3 shows that the average power of a carrier 30 and sidebands 32 of the bursts fall within FCC regulatory limits 34 set forth in 47 CFR §15.209 (1999). Accordingly, the FCC has granted approval of products incorporating this invention under 47 CFR §15.249 (1999), which sets forth the frequency bands for intentional radiators. This invention preferably operates in the third band. Field strength limits are also specified as 50 mV/M (94 dB$\mu$V) within the band at a distance of 3 meters and 500 $\mu$V/M (54 dB$\mu$V) outside the band at a distance of 3 meters. If the transmitted pulses have less than a 1% duty factor, the limits are 20 db higher. (47 CFR §15.249(c) sets forth that radiated emissions outside the allotted frequency bands shall be attenuated by at least 50 dB below the fundamental frequency or to the general radiated emission limits set forth in 47 CFR §15.209, whichever is the lesser attenuation. The general radiation limit specified set forth in 47 CFR §15.209 for frequencies above 960 MHZ is 500 $\mu$V/m.

Referring again to FIGS. 1 and 2, the RGR receiver employs a homodyne peak detector 36 and shares an antenna 38 with RGR transmitter 12. Antenna 38 is a simple dipole etched on the circuit board. Preferably, antenna 38 is a vertically polarized dipole antenna fabricated on a printed circuit board to precisely position the radiating elements above a ground plane and provide an economical way of controlling critical dimensions of antenna 38. This antenna configuration provides a radiation pattern having a uniform response required for accurate target size determination.

The receiver range is determined by adjustable 3 to 100 nanosecond delay circuit 20, which causes mixing of the transmitted pulse with the adjustably delayed local-oscillator pulse that is also transmitted but its reflections are ignored. Because the pulses propagate through air at about one foot per nsec, each 10 nsec pulse spans a 10 foot one-way range, or five feet for two-way propagation. Adjustable 3 to 100 nanosecond delay circuit 20 is preferably settable to four separate delays for detecting objects within four predetermined ranges corresponding to 0–9 feet (15–21 nsec.), 8–18 feet (31–41 nsec.), 17–27 feet (38–60 nsec.), and 25–35 feet (62–78 nsec.). These ranges are also referred to as range shells.

Each reflected transmit pulse is mixed with its associated delayed local-oscillator pulse by homodyne peak detector 36 that generates a baseband signal. Stationary objects reflect the same frequency as the second pulse and are, therefore, mixed down to a zero frequency, whereas moving objects reflect a Doppler shifted frequency and are, therefore, mixed down to an audio frequency that depends on a rate of object motion. The detected baseband signal is stored on a hold capacitor 39, reconstructed, amplified, processed, and bandpass filtered by an active filter/amplifier 40 to frequencies ranging from about 3 Hz to about 100 Hz, thereby preventing detection of stationary objects. If detection of stationary objects is desired, the bandpass filter may be changed to a lowpass filter. A microprocessor 42 determines whether the processed signal has a predetermined pattern and exceeds a predetermined threshold. If it does, an alarm condition is indicated by a light-emitting diode and/or a relay 46. The detection threshold is programmable in microprocessor 42 as a function of range and may be set to discriminate object sizes. Verification of a valid alarm condition may be required through several repetitions of a signal of appropriate amplitude with or without alternating polarity.

Figure 4:
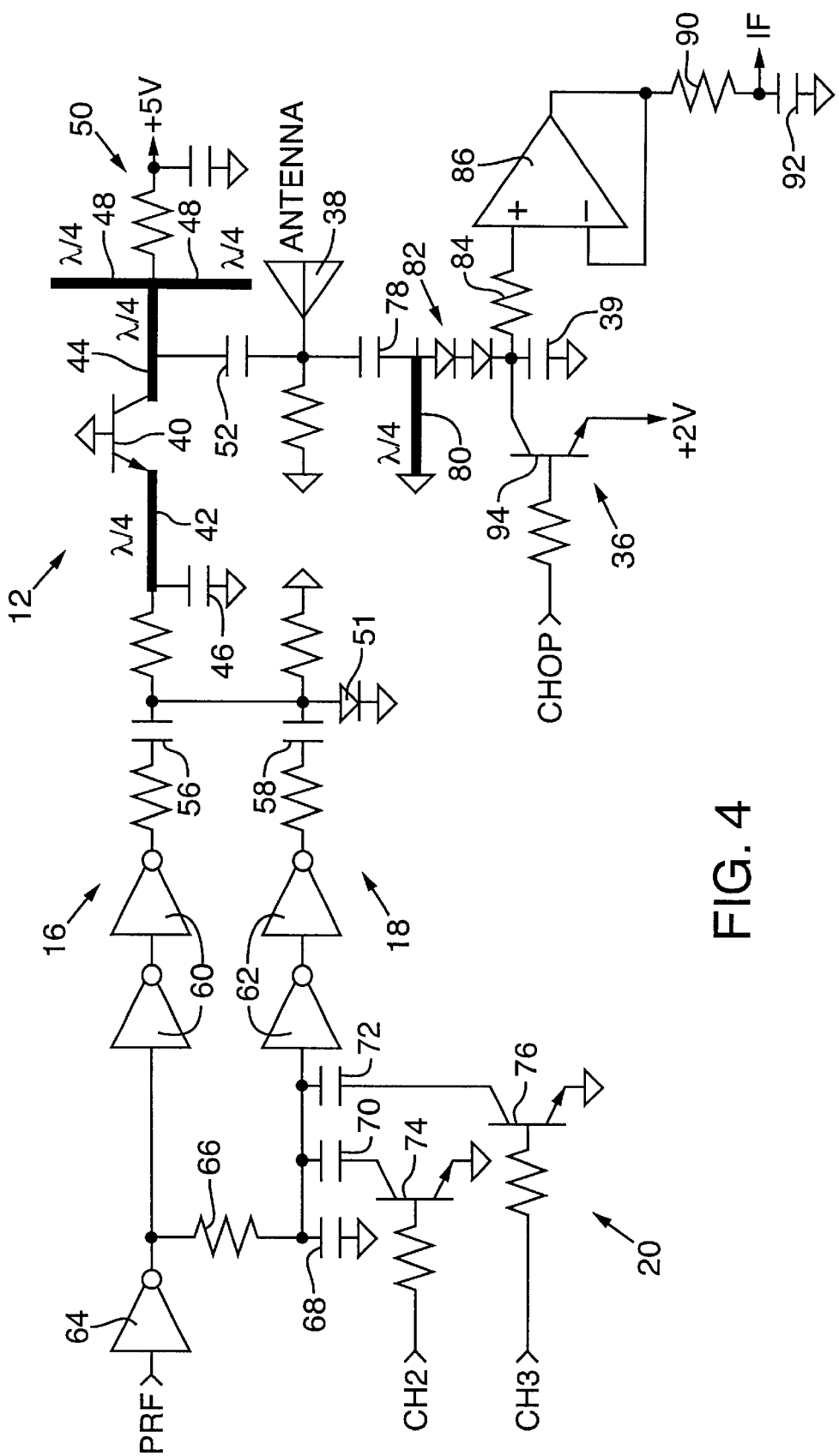
FIG. 4 is a schematic circuit diagram of a preferred embodiment of the transceiver of FIG. 2.

FIG. 4 shows a preferred circuit embodiment of the above-described RGR transmitter 12, one-shots 16 and 18, and homodyne detector 36. In particular, RGR transmitter 12 is implemented as a common base transistor oscillator 40 having quarter-wavelength reactive elements 42 and 44 connected to its emitter and collector. The opposite ends of quarter-wavelength reactive elements 42 and 44 are bypassed to RF ground respectively by a 0.5 picoFarad ("pF") capacitor 46 and a pair of quarter-wavelength stubs 48. Plus five volt power is connected to the junction of quarter-wavelength stubs 48 through an RC decoupling network 50. RGR transmitter 12 emits RF energy whenever the emitter of transistor 40 is driven below ground by negative-going pulses received from 10-nsec one-shots 16 and 18. A diode 51 prevents the emitter of transistor 40 from being reverse-biased. The resulting RF energy pulses are coupled to antenna 38 through a 1.2 pF coupling capacitor 52.

The operating frequency of RGR transmitter 12 is not affected by resonance of antenna 38. The duration of each 3 to 20 nsec RF energy burst is primarily determined by 120 pF coupling capacitors 56 and 58 coupling one-shots 16 and 18 to the emitter of transistor 40. The preferred 5.8 GHz±75 MHz center operating frequency is adjusted by linking-in small PCB tabs (not shown) connected to the collector of transistor 40. The output power of RGR transmitter 12 is determined by the efficiency of antenna 38, the impedance of transistor 40, and the power supply voltage. The 5.8 GHz carrier frequency is preferably adjusted to be within FCC power limit 34 (FIG. 3). Transistor 40 is preferably a type BFS520.

10-nsec one-shots 16 and 18 are preferably implemented as cascaded pairs of type 74AC14 inverters 60 and 62 that drive coupling capacitors 56 and 58. The PRF signal from PRF generator 14 is received by an inverter 64 and coupled directly to inverters 60. The inverted PRF signal is also coupled to inverters 62 through adjustable 3 to 100 nanosecond delay circuit 20, which includes a 1,100 ohm resistor 66 and an 8 pF capacitor to ground that form the preferable 10 nsec delay. 18 pF and 33 pF capacitors 70 and 72 are connectable in parallel to capacitor 68 by transistors 74 and 76 to provide switchable delays up to 70 nsec. Transistors 74 and 76 are switched by respective signals CH2 and CH3, which are described with reference to FIG. 6.

Homodyne detector 36 is coupled to antenna 38 by a 1.0 pF capacitor 78 and to DC ground by a quarter-wavelength stub 80. Detection is accomplished by a dual-diode 82 that stores the detected signal on hold capacitor 39. The detected signal is coupled through a 100 ohm resistor 84 to a unity gain amplifier 86. The resulting IF signal is RF decoupled from amplifier 86 by a 22 ohm resistor 90 and a 100 pF capacitor 92. The detected signal stored on hold capacitor 39 is periodically discharged by a CHOP signal that drives a switching transistor 94 that is effectively connected across hold capacitor 39. The CHOP signal is described with reference to FIG. 6.

Figure 5A:
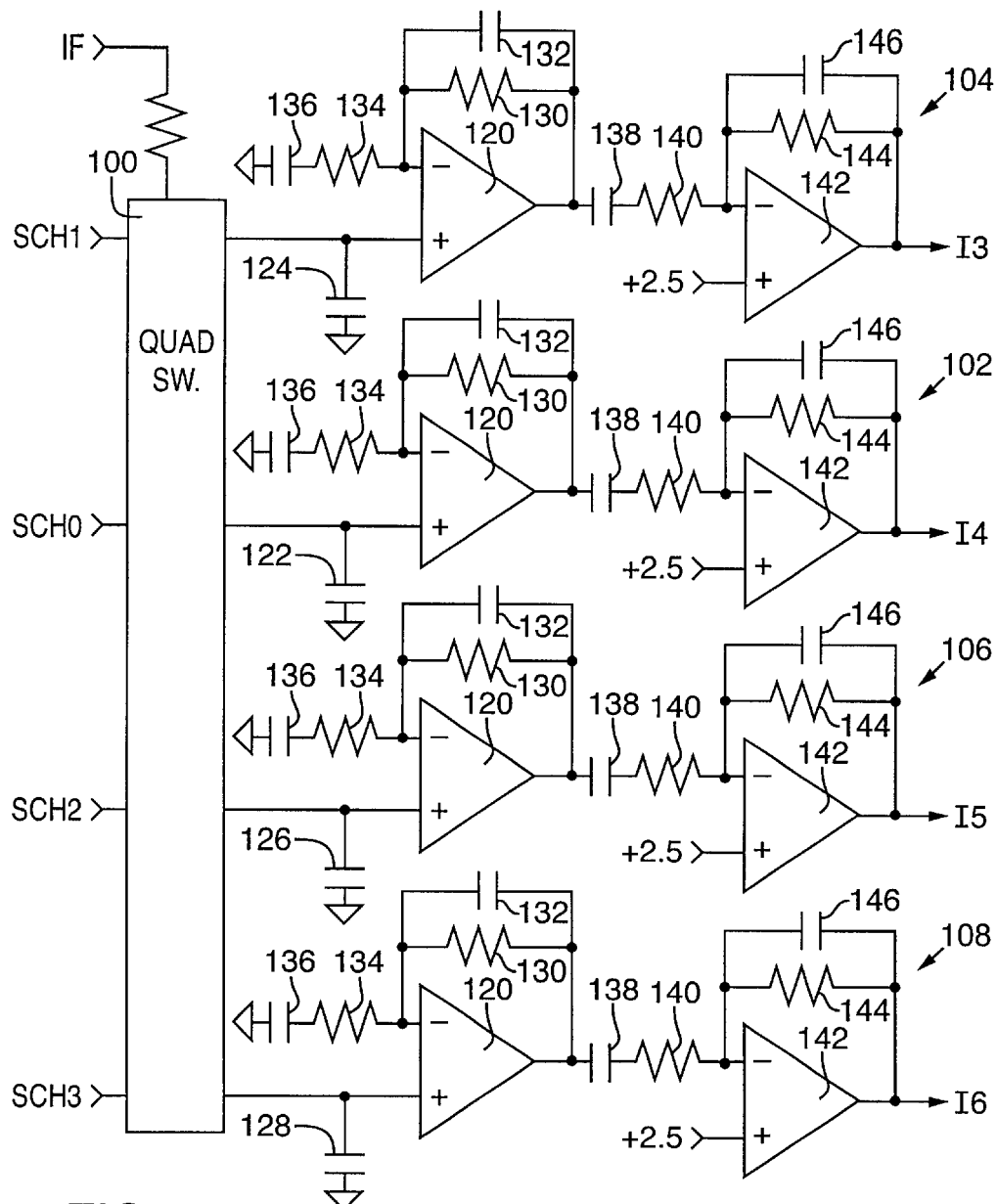
FIGS. 5A and 5B are simplified schematic circuit diagrams of a preferred embodiment of the signal processor of FIG. 2.
Figure 5B:
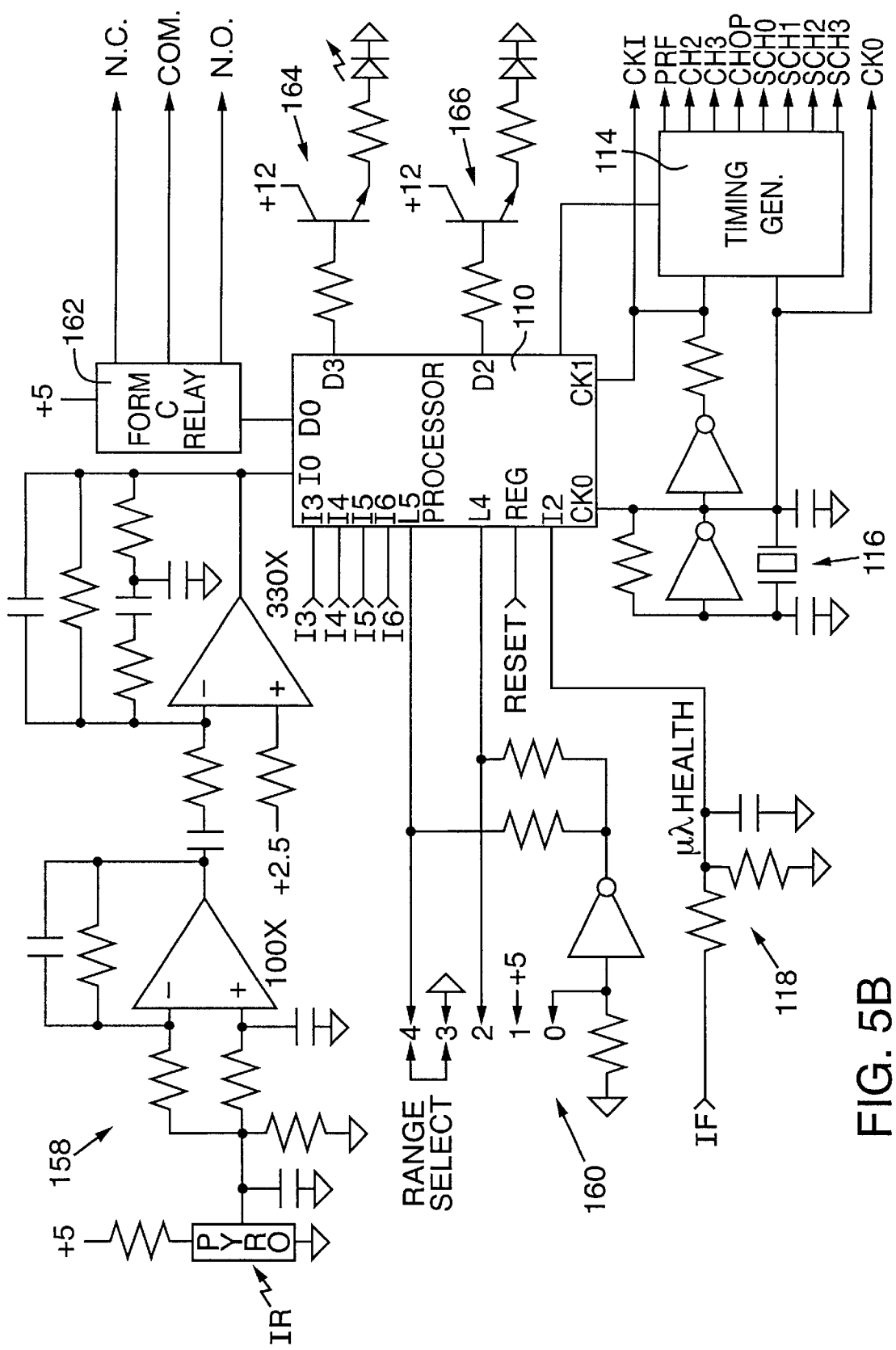

FIGS. 5A and 5B show, in more detail, a preferred circuit embodiment of the signal processing portion of RGR motion detector 10. The baseband IF signal from homodyne detector 36 is received by an MC14066B 4-way analog switch 100 for switching to one of four bandpass filters 102, 104, 106, and 108 in response to respective range-selecting signals SCH0, SCH1, SCH2, and SCH3. Each bandpass filter output is connected for signal processing to an analog-to-digital converter input channel I-3 to I-6 of a microprocessor 110, preferably a model COP8ACC5. Clock and control signal sequences are generated by a model COP912 timing generator 114 in response to a 10 megaHertz system clock 116. The IF signal is also received by a low-pass filter 118 that provides a "microwave health" signal to input channel I2 of microprocessor 110 for system testing purposes.

Referring to FIG. 5A, bandpass filters 102 to 108 have substantially identical input stages including type LMV324 amplifiers 120 with capacitors 122, 124, 126, and 128 connected between the non-inverting amplifier input and ground. Resistors 130 in parallel with capacitors 132 are connected between the outputs and inverting inputs of amplifiers 120, and resistors 134 in series with capacitors 136 are connected between ground and the inverting inputs of amplifiers 120.

The input stages are coupled by capacitors 138 in series with resistors 140 to the inverting inputs of second stage amplifiers 142 of bandpass filters 102 to 108. The second stage amplifiers 142 each have feedback resistors 144 in parallel with feedback capacitors 146.

Bandpass filters 102, 104, 106, and 108 have respective inverting gains of about 14, 141, 475, and 566; low cutoff frequencies of about 1.59 Hz; and high cutoff frequencies of about 100 Hz to reduce fluorescent light noise. The gains increase roughly as the square of the selected range.

Referring to FIG. 5B, a conventional PIR motion detector 158 is connected to input channel I0 of microprocessor 110 to improve overall motion detection performance and flexibility and false alarm immunity.

A range selection circuit 160 provides jumper selection of RGR ranges by providing the four possible logic state combinations to inputs L4 and L5 of microprocessor 110.

A relay 162 actuated by microprocessor 110 provides normally opened and normally closed contacts for indicating alarm conditions to, for example, annunciators, alarm panels, remote monitoring stations, and alarm wiring loops. Visual indication of alarm, test, and trouble conditions is provided by light-emitting diode circuits 164 and 166, which are driven by respective microprocessor data outputs D3 and D2.

Software executed by microprocessor 110 executes generally according to the following specifications:

The IF signal sampling period and threshold are adjustable for each range shell to provide added sensitivity depending on the selected range.

Signal processing function include performing A/D conversion on the four 100 Hz bandwidth signals from bandpass amplifiers 102 to 108 and processing the converted signals to determine whether an alarm state exists. The IF signals are sufficiently oversampled to allow their capture within 90% of the peak value. IF signal zero crossings may be monitored to determine a velocity of the detected object. Frequencies above 100 Hz (−3 dB point) are filtered to prevent aliasing of higher frequency signals to frequencies below the 8 kHz A/D sampling frequency.

Alarm conditions include +/−/+/− or −/+/−/+ transitions above a predetermined threshold for each range. A valid target is detected by at least 2 cycles of signal amplitude exceeding the predetermined threshold during a predetermined period. The PIR motion detector 158 signal may be used for verification. The PIR signal frequency should be between 0.1 Hz and 10 Hz. An alarm condition may also be verified by determining whether RF noise exists on the other three range channels. This is checked by: checking the polarity of the signal (if any exists) on the other three channels, and if it is the same on two or more channels, and of appropriate amplitude, it may be considered RF noise.

When using multiple range shells, similar signal-to-noise ratios may be achieved for each range shell by employing some combination of increasing the number of signal sample averages as the range increases (with or without changing the PRF), increasing the transmitted power at longer ranges, and varying the burst length according to range to compensate the averaging time for each sample.

Also when using multiple range shells, the alarm decision threshold may be set for each range shell so that the thresholds are constant in terms of a cross-sectional area and reflectance/scattering of the target object. The reflected signal from a constant sized target decreases inversely by the second power (in terms of voltage, inversely to the fourth power in terms of power) of the range from the sensor. The decision threshold, or system gain, or a combination of the two, can be adjusted for each range to compensate for this reduction. For example, the system gain may be varied by adjusting the transmitted power, the sampling efficiency, the baseband gain, the decision threshold, or a combination of these so that the same target produces the same result at different ranges.

When using single or multiple range shells, the RF burst amplitude may be sampled so that calibration may be maintained as the amplitude changes. Sensing the RF burst amplitude entails some combination of monitoring the transmitter power supply current, monitoring the amplitude sensed by the homodyne detector, and monitoring the amplitude with an independent receiver.

This invention may incorporate a range calibration system. It is often desirable to limit the detection range to a particular boundary such as a wall. This is accomplished by placing a setup target, such as a tuning fork or electronically switched pin diode reflector, at a perimeter distance. The target is designed to produce a unique Doppler return. The RGR is placed in a calibration mode and its maximum range adjusted to the distance to the setup target, thereby protecting the RGR from false alarms outside the perimeter.

When changing the PRF to compensate for range or other reasons, the sampling efficiency on hold capacitor 39 changes in proportion to the PRF. This change can be compensated for by changing the value of hold capacitor 39 inversely with the PRF, thereby maintaining close to 100 percent sampling efficiency, and at the same time, optimizing noise averaging on hold capacitor 39. The capacitor value may be changed proportionally with the PRF by employing transistors to switch additional capacitors in parallel with hold capacitor 39 in a manner similar to the switches employed in adjustable 3 to 100 nanosecond delay circuit 20.

Microprocessor 110 is programmed to include the following self test features.

Determining whether the RF section is defective entails sensing whether the microwave health signal drops below a predetermined voltage for a predetermined time period. If the RF section is defective, microprocessor 110 blinks at least one of LED circuits 164 and 166, ignores signals from the RF section, and continues to test the RF section at predetermined intervals.

Amplifiers 86 and 120 may be checked by disabling pulse transmission and discharging hold capacitor 39. All the amplifier voltages sensed by the A/D inputs on microprocessor 110 should be at about 2.5 volts. After determining that the amplifier voltages are in the correct range, all channels of analog switch 100 are turned on and switching transistor 94 is toggled on/off by the CHOP signal at a predetermined frequency. Microprocessor 110 then determines that the A/D inputs are sensing the predetermined frequency and correct amplitude on all of the channels.

LED circuits 164 and 166 are checked by walking within range of the motion detectors. During the walk test, illumination of a green LED indicates activation of PIR motion detector 158, and illumination of a yellow LED indicates activation of RGR motion detector 10. Illumination of a red LED and closure of relay 162 for about 2.5 seconds indicates an alarm condition.

The RGR circuit board preferably includes test points for probing the following timing generator 114 signals:

SCH0 is a signal for closing the analog switch 100 channel for range 0;

SCH1 is a signal for closing the analog switch 100 channel for range 1;

SCH2 is a signal for closing the analog switch 100 channel for range 2;

SCH3 is a signal for closing the analog switch 100 channel for range 3;

CHOP is a signal for resetting the signal on hold capacitor 39;

CH2 and CH3 are signals for selecting ranges;

PRF is the pulse repetition frequency signal; and

Clk_Dis is a logic low signal for disabling timing generator 114.

The RGR circuit board may include test points for probing the output signals from analog switch 100. The sampled voltage level from each detection range output should range between about 2 and 3 Vdc, depending on the microwave power output level.

The RGR circuit board also includes a test point for probing the IF signal generated by amplifier 86. The IF signal is normally a 20 kHz sampled and reset signal with a 2 to 3 volt DC average level.

The circuit board also includes test points for probing the outputs of bandpass filters 102, 104, 106, and 108. Each output should include the baseband signal riding on 2.5 Vdc±0.2 Vdc offset voltage.

The RGR circuit board includes a test point for probing the output of PIR motion detector 158. The output signal should ride on a 2.5 Vdc±0.5 Vdc offset voltage.

The RGR circuit board includes test points for probing the microprocessor 110 input signals generated by 10 MHZ system clock 116, a reset signal circuit, and range selection circuit 160.

Operation of the signal processor is further described with reference to the following waveform figures.

FIG. 6 shows various signal transitions that occur during a 600 microsecond (usec.) period starting during a range 0 (9 foot) detection cycle.

An SCH0 waveform 170 shows 0–9 foot range signal samples 172 occurring at about a 2 kHz sampling frequency.

An SCH1 waveform 174 shows 1–18 foot range signal samples 176 occurring at about a 4 kHz sampling frequency.

An SCH2 waveform 178 shows 2–27 foot range signal samples 180 occurring at about a 6 kHz sampling frequency.

An SCH3 waveform 182 shows 3–35 foot range signal samples 184 occurring at about an 8–10 kHz sampling frequency.

A PRF waveform 186 shows an effective 400 kHz clock signal, which is unresolvable at the 600 usec period scale shown.

CH2 and CH3 waveforms 188 and 190 show binary logic states for range setting adjustable 3 to 100 nanosecond delay circuit 20 according to the following logic state combinations:

CH2 (0) and CH3 (0) selects range 0;

CH2 (0) and CH3 (1) selects range 2;

CH2 (1) and CH3 (0) selects range 1; and

CH2 (1) and CH3 (1) selects range 3.

The rising edge of a CHOP waveform 194 resets the signal voltage detected by dual diode 82. The rising edge occurs when all analog switch 100 channels are off, and does not coincide with the rising edge of a PRF pulse.

FIG. 7 shows control signal transitions occurring during a 50 usec period between timing cursors 195 (shown in dashed lines) in which a range 0 (9 foot) detection cycle is selected by CH2 and CH3 waveforms 188 and 190 being at a logic zero state. During this period, PRF waveform 186 has 20 rising edges, which corresponds to about 400 kHz. Seven microwave bursts occur while SCH0 waveform 170 is in sampling state 172, and 13 bursts occur when it is in a logic zero state. PRF waveform 186 shows a gap 196 occurring near the end of the range 0 period. Gap 196 occurs when the control program loops back to a starting point.

FIG. 8 shows control signal transitions occurring during a 50 usec period between timing cursors 195 in which a range 1 (18 foot) detection cycle is selected by CH2 waveform 188 being at a logic one state and CH3 waveform 190 being at a logic zero state. Seven microwave bursts occur while SCH1 waveform 174 is in sampling state 176. However, there is a 2 usec. sampling time difference between sampling pulses 172 and 176 of ranges 0 and 1 to improve the signal-to-noise ratio.

Figure 10:
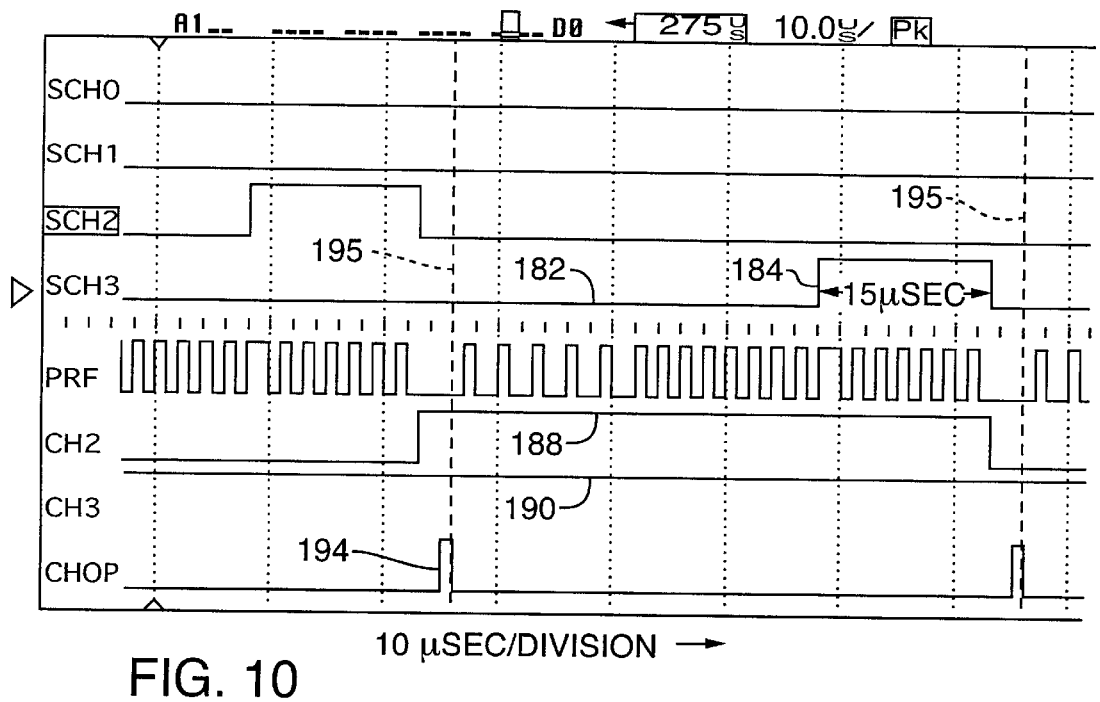
FIG. 10 is an oscillographic representation showing control signal transitions occurring during a period 50 usec period including the range 3 (35 foot) detection cycle.

FIGS. 9 and 10 show corresponding control signal transitions occurring during 50 usec periods between timing cursors 195 in which the respective range 2 (27 foot) and range 3 (35 foot) detection cycles are enabled by CH2, CH3, SCH2, and SCH3 waveforms 188, 190, 178, and 182.

The amplitude of the received signal is proportional to the cross-sectional area of the target and inversely proportional to the distance to the target, thus providing the basis for homodyne detector 36 to generate signals proportional to target size. This invention uses the target size signal in conjunction with thresholds in microprocessor 110 to provide alarm signals for large targets, such as people, while ignoring small targets, such as pets. For example, a human being over five feet tall and 100 pounds will be detected after taking four 30-inch steps at a speed of 0.5 to 7 feet per second, but objects will not be detected that are shorter than four feet long, under 50 pounds, and farther than three feet from the detector.

Portions of this invention may be implemented differently from the implementations described above for a preferred embodiment. For example, component values, operating frequencies, and pulse durations may be varied to suit particular applications, including applications that may not require FCC certification.

The transmit burst may be self-detected to avoid nuisance alarms caused by birds, rodents, and small objects within approximately 3 feet of the detector.

A delay line may be used on the antenna to provide detection of close objects.

An array of delay lines and multiple antennae may be employed to create an array of protected zones.

An array of microwave boards may feed a single base band board.

RF immunity may be achieved by sensing simultaneous in-phase excitation of multiple range shells.

Vibration immunity may be increased by sensing non-in-phase simultaneous excitation of multiple range shells.

Detection range of the RGR may be set by inhibiting or ignoring outer range shells, or by maintaining the same number of shells but compressing the time base.

Detector "health" may be monitored by sensing the detector diode bias voltage.

False alarm immunity may be increased by "AND"ing the RGR and PIR signals. Alternatively, the "AND"ing may occur asynchronously during a 5 second window.

The baseband frequency may be used to determine alarm validity. For example, a 1 Hz baseband signal is too low, and a 100 Hz signal is too high to represent a signal reflected by a human target.

The RGR of this invention may be used in various applications including automatically opening doors, energy management, safety interlocks, range finders, automobile curb finders, and collision avoidance.

Motion direction classification and false-alarm immunity improvements can be implemented by sensing sequential activation of outer-to-inner, or vice-versa, range shells.

It will be obvious to those having skill in the art that many changes may be made to the details of the above-described embodiment of this invention without departing from the underlying principles thereof. Accordingly, it will be appreciated that this invention is also applicable to object sensing and motion detection applications other than those found in intrusion detection and alarm systems. The scope of the present invention should, therefore, be determined only by the following claims.

We claim:

1. An FCC certifiable range-gated radar apparatus for detecting an object within a predetermined range of distances: comprising:

a pulse generator generating at a repetition frequency ranging from about 50 kHz to about 500 kHz, groups of first and second drive pulses having first and second durations ranging from about 3 nanoseconds to about 20 nanoseconds, and separated by a time period ranging from about 3 nanoseconds to about 100 nanoseconds;

an oscillator receiving the groups of first and second drive pulses and generating at a carrier frequency greater than 960 MHZ groups of first and second microwave pulses;

an antenna radiating at least the first microwave pulses into an area including the predetermined range of distances and receiving reflected first microwave pulses from the object, the radiated microwave pulses having a signal strength at 3 meters from the antenna that is less than 94 dB$\mu$V at frequencies less than 75 MHZ from the carrier frequency and a signal strength less than 54 dB$\mu$V at frequencies greater than 75 MHZ from the carrier frequency; and a homodyne detector mixing at least the second microwave pulses and the reflected first microwave pulses to produce a baseband signal indicative of at least one of a presence and a movement of the object.

2. The apparatus of claim 1 in which the predetermined range of distances is selectable in multiple range shells including an distance from zero feet to about 50 feet.

3. The apparatus of claim 1 in which the carrier frequency is in a range from about 960 MHz to about 25 GHz.

4. The apparatus of claim 1 in which the first and second microwave pulses have a substantially half-sine envelope shape and contain about 15 to 50 cycles of energy.

5. The apparatus of claim 1 in which the baseband signal is AC coupled such that the apparatus detects the object only if it is undergoing a movement.

6. The apparatus of claim 1 further including a signal processor that conditions the baseband signal with at least one of an amplifying operation, a filtering operation, and a thresholding operation.

7. The apparatus of claim 6 in which the filtering operation passes signal components ranging from about 0.3 Hz to about 500 Hz.

8. The apparatus of claim 6 in which the thresholding operation includes a predetermined threshold and an alarm condition is indicated if the conditioned baseband signal exceeds the predetermined threshold.

9. The apparatus of claim 6 in which the thresholding operation includes a threshold level that is adjustable as a function of the predetermined range and a size of the object.

10. The apparatus of claim 1 further including a passive infrared ("PIR") motion detector that cooperates with the range-gated radar to indicate an alarm condition.

11. The apparatus of claim 10 further including a logical AND operation and in which the PIR motion detector generates a PIR signal, the baseband signal and the PIR signal being processed through the logical AND operation to increase a false alarm immunity of the apparatus.

12. The apparatus of claim 11 in which the baseband signal and the PIR signal satisfy the logical AND operation condition by asynchronously occurring anytime during about a 5 second time window.

13. An FCC certifiable method for detecting an object within a predetermined range of distances: comprising:

generating at a repetition frequency ranging from about 50 kHz to about 500 kHz, groups of first and second drive pulses having first and second durations ranging from about 3 nanoseconds to about 20 nanoseconds, and separated by a time period ranging from about 3 nanoseconds to about 100 nanoseconds;

generating in response to receiving the groups of first and second drive pulses groups of first and second microwave pulses having a carrier frequency greater than 960 MHZ;

radiating at least the first microwave pulses into an area including the predetermined range of distances and receiving reflected first microwave pulses from the object, the radiated microwave pulses having a signal strength at 3 meters from the antenna that is less than 94 dB$\mu$V at frequencies less than 75 MHZ from the carrier frequency and a signal strength less than 54 dB$\mu$V at frequencies greater than 75 MHZ from the carrier frequency; and mixing at least the second microwave pulses and the reflected first microwave pulses to produce a baseband signal indicative of at least one of a presence and a movement of the object.

14. The method of claim 13 further including AC coupling the baseband signal and detecting the object only if it is undergoing a movement.

15. The method of claim 13 further including processing the baseband signal with at least one of an amplifying process, a filtering process, and a thresholding process.

16. The method of claim 15 in which the thresholding process includes setting a predetermined threshold and indicating an alarm condition if the baseband signal exceeds the predetermined threshold.

17. The method of claim 15 in which the thresholding process includes adjusting a threshold level as a function of the predetermined range and a size of the object.

18. The method of claim 15 in which the filtering process passes baseband signal components ranging from about 0.3 Hz to about 500 Hz.

19. The method of claim 18 further including validating an alarm condition by determining whether the baseband signal includes a frequency higher than 1 Hz and lower than 100 Hz.

20. The method of claim 13 further including changing the predetermined time period to generate multiple range shells, and determining a direction of motion of the object by sensing a direction of sequential detection of the object in different ones of the multiple range shells.

* * * * *